United States Patent
Lee et al.

(10) Patent No.: US 7,907,922 B2
(45) Date of Patent: Mar. 15, 2011

(54) RECEIVER WITHOUT PHASE LOCKED LOOP FREQUENCY SYNTHESIZER AND RECEIVING METHOD USING THE SAME

(75) Inventors: Jeong-Ho Lee, Suwon-si (KR); Joong-suk Park, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 783 days.

(21) Appl. No.: 11/583,907

(22) Filed: Oct. 20, 2006

(65) Prior Publication Data

US 2007/0091212 A1    Apr. 26, 2007

(30) Foreign Application Priority Data

Oct. 20, 2005   (KR) .................. 10-2005-0099229

(51) Int. Cl.
  *H04B 7/08*   (2006.01)
  *H04B 1/18*   (2006.01)
  *H04B 1/26*   (2006.01)
(52) U.S. Cl. .............. 455/130; 455/140; 455/179.1; 455/313; 455/334
(58) Field of Classification Search ........ 455/3.01–3.06, 455/552.1–553.1, 86, 132–133, 136, 138, 455/139, 140, 147, 151.3, 176.1, 179.1–180.1, 455/188.1, 208, 255–259, 313, 334, 337
See application file for complete search history.

(56) References Cited

U.S. PATENT DOCUMENTS

| | | | | |
|---|---|---|---|---|
| 5,280,636 A * | 1/1994 | Kelley et al. | ........ | 455/131 |
| 5,430,890 A * | 7/1995 | Vogt et al. | ........ | 455/180.3 |
| 6,005,900 A * | 12/1999 | Zangi | ........ | 375/350 |
| 6,133,802 A * | 10/2000 | Ma | ........ | 331/172 |
| 6,163,685 A * | 12/2000 | Dilling et al. | ........ | 455/247.1 |
| 6,411,653 B1 * | 6/2002 | Arunachalam et al. | ........ | 375/260 |
| 6,510,175 B1 * | 1/2003 | Hunsinger et al. | ........ | 375/216 |
| 6,748,028 B1 * | 6/2004 | Torre et al. | ........ | 375/320 |
| 7,035,610 B2 * | 4/2006 | Tsushima | ........ | 455/240.1 |
| 7,200,364 B2 * | 4/2007 | Lim et al. | ........ | 455/76 |
| 7,463,874 B2 * | 12/2008 | Kang et al. | ........ | 455/285 |
| 7,466,962 B2 * | 12/2008 | Peplinski et al. | ........ | 455/83 |
| 2002/0060751 A1 | 5/2002 | Rowe et al. | | |
| 2005/0090213 A1 | 4/2005 | Heng et al. | | |
| 2006/0053453 A1 * | 3/2006 | Kasamatsu et al. | ........ | 725/81 |

FOREIGN PATENT DOCUMENTS

KR  10-2004-0048168 A  6/2004
KR  10-2004-0055528 A  6/2004

* cited by examiner

*Primary Examiner* — Simon D Nguyen
(74) *Attorney, Agent, or Firm* — Sughrue Mion, PLLC

(57) ABSTRACT

A receiver implemented without using a phase locked loop frequency synthesizer and a receiving method of a receiver implemented without using a phase locked loop frequency synthesizer are provided. The receiver includes a radio frequency (RF) receiving unit; a band-selecting unit; an RF amplifier; a local oscillation (LO) signal generator; a mixer; an IF amplifier; an analog to digital (A/D) converter; and a channel-selecting unit. The method includes passing a frequency band of a radio frequency (RF) signal received by an RF receiving unit; amplifying the passed RF signal; generating a local oscillation (LO) signal having a fixed frequency; mixing the LO signal with the amplified RF signal to lower the frequency of the amplified RF signal; outputting an intermediate frequency (IF) signal; amplifying the IF signal; converting the amplified IF signal into a digital signal; and selectively passing frequencies of the digital signal corresponding to a specific channel.

34 Claims, 11 Drawing Sheets $F_{RF1}$ = 200 MHz  $F_{RF2}$ = 208 MHz $F_{LO1}$ = 195 MHz  $F_{LO2}$ = 203 MHz $F_{IF}$ = 5 MHz $F_{IF}$ = 5 MHz $F_{RF1}$ = 200 MHz   $F_{RF2}$ = 208 MHz $F_{RF1}$ = 200 MHz   $F_{RF2}$ = 208 MHz $F_{RF1}$ = 200 MHz  $F_{RF2}$ = 208 MHz $F_{LO}$ = 189 MHz $F_{IF1}$ = 11 MHz    $F_{IF2}$ = 19 MHz $F_{IF1}$ = 11 MHz    $F_{IF2}$ = 19 MHz

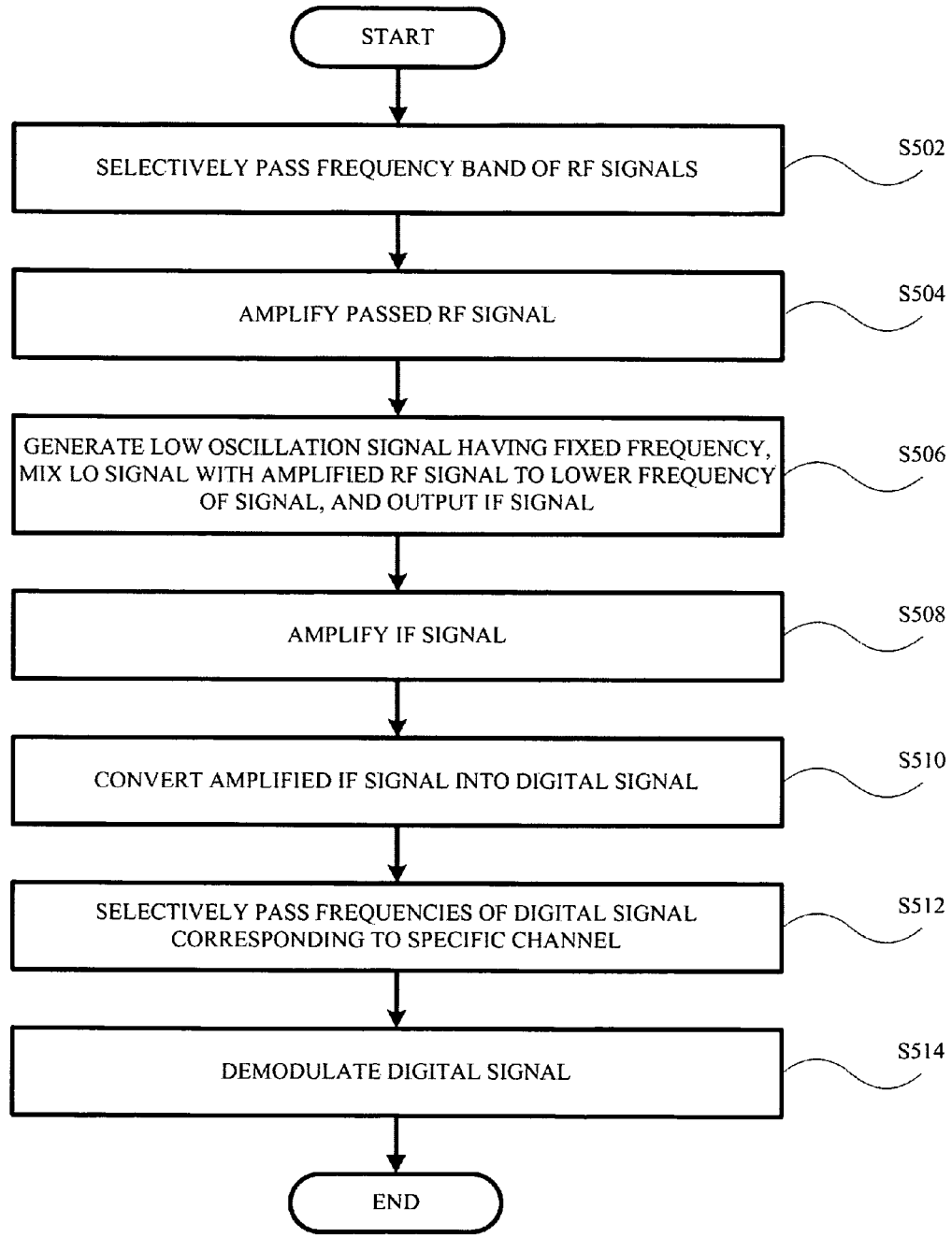

RECEIVER WITHOUT PHASE LOCKED LOOP FREQUENCY SYNTHESIZER AND RECEIVING METHOD USING THE SAME

CROSS-REFERENCE TO RELATED APPLICATION

This application claims priority from Korean Patent Application No. 10-2005-0099229 filed on Oct. 20, 2005 in the Korean Intellectual Property Office, the disclosure of which is incorporated herein by reference in its entirety.

BACKGROUND OF THE INVENTION

1. Field of the Invention

Apparatuses and methods consistent with the present invention relate to a receiver and a receiving method, and, in particular, to a receiver that uses a digital channel filter capable of controlling a center frequency according to a selected channel, instead of a phase locked loop (PLL) frequency synthesizer having a complicated block configuration and thus a high current consumption, so as to improve the efficiency.

2. Description of the Related Art

Digital Multimedia Broadcasting (DMB) is a digital wireless communication service that provides multimedia content through a microwave band currently used for analog television (TV) broadcasts. In order to provide such a service, a DMB chip should be secured. Therefore, a chip having a small size and low power consumption is required. Digital signal processing research and development has led to a digital channel filter having a high selectivity. Accordingly, a recent trend is to select a low intermediate frequency, perform analog to digital (A/D) conversion of the selected frequency, and digitally filter the converted frequency.

A receiver that does not use the digital channel filter, but uses a PLL frequency synthesizer will now be described with reference to FIGS. 1 and 2. FIG. 1 is a view showing the configuration of a wireless receiver with a PLL frequency synthesizer according to the related art. FIG. 2 is a schematic view showing spectrums of frequency signals output by individual blocks of the wireless receiver of FIG. 1.

First, a tunable band pass filter (BPF) 10 receives a radio frequency (RF) signal received by an antenna and a control signal of a digital demodulator 70 according to channel selection by a main body (not shown) connected to the receiver. The tunable BPF 10 passes a wideband frequency signal including a desired signal. FIG. 2A shows the frequency spectrum of a signal "a" received by the antenna and FIG. 2B shows the frequency spectrum of the signal "b" passed by the tunable BPF 10. The tunable BPF 10 passes a certain spectrum of the signal "a" and outputs a signal having center frequencies of 200 MHz and 208 MHz. An Low Noise Amplifier (LNA) 20 amplifies the output signal on the basis of the control signal of the digital demodulator 70 to obtain an appropriate gain and outputs the amplified signal (signal "c").

A voltage controlled oscillator (VCO) 80 generates a local oscillation frequency and supplies the local oscillation frequency to a frequency divider 120. The frequency divider 120 transforms the high-frequency signal supplied from the voltage controlled oscillator 80 into a low frequency signal at a certain rate, which may be predetermined, and supplies the low frequency signal to a phase detector 100. The phase detector 100 compares the supplied signal with a reference frequency signal that is supplied as a reference of the PLL frequency synthesizer by a reference frequency oscillator 110, and outputs a signal having a duty cycle corresponding to the difference between the two signals. A loop filter 90 receives the signal output by the phase detector 100, converts the received signal into a DC control signal, and outputs the DC control signal to the voltage controlled oscillator 80. The voltage controlled oscillator 80 generates a local oscillation frequency signal according to the DC control signal. The local oscillation frequency signal is input to the frequency divider 120, as described above. In this way, a closed loop is formed, and the local oscillation frequency is locked to a frequency based on the low frequency reference frequency. Further, the voltage controlled oscillator 80 also transmits an output signal "d" to a mixer 30. The output signal "d" can be generated by selecting one frequency among frequencies of various tones. For example, in FIG. 2D, a signal having a frequency of 195 MHz (or 203 MHz) is output among frequency signals depicted by the dotted lines.

The mixer 30 mixes the signal "d," output by the voltage control oscillator 80 with the RF signal "c", as shown in FIG. 2C, amplified by the LNA 20 to perform frequency down-conversion, and outputs an intermediate frequency (IF) signal "e", as shown in FIG. 2E, having a fixed frequency corresponding to the difference between the frequencies of the two signals. The IF signal "e" is an IF signal having a fixed center frequency of 5 MHz corresponding to the difference between the signal "c" (200 MHz) and the signal "d" (195 MHz). Alternatively, when a signal of 203 MHz instead of the signal of 195 MHz is selected as the signal "d", an IF signal having a fixed center frequency of 5 MHz corresponding to the difference between 208 MHz of the signal "c" and 203 MHz of the signal "d" may be output. A channel BPF 40 receives the IF signal "e", and selectively passes only a desired channel. An IF amplifier 50 amplifies the desired channel according to the control signal of the digital demodulator 70. FIGS. 2F and 2G show signals "f" and "g" before and after the IF amplifier 50, respectively. As can be seen from FIGS. 2F and 2G, a signal having a fixed center frequency of 5 MHz is selected and output. The signal "g" is input to an A/D converter 60 and is converted into a digital signal. The digital demodulator 70 receives and demodulates the digital signal, and outputs the demodulated digital signal to a decoder of the main body (not shown).

In the above-described receiver, the PLL frequency synthesizer used for such a receiver occupies a large proportion of the chip layout area, thereby increasing its cost. Further, since the PLL frequency synthesizer needs many blocks, such as a VCO, a loop filter, and a frequency divider, the current consumption increases. As a result, when the PLL frequency synthesizer is used in a portable device, its battery life decreases. Further, since the tunable BPF 10 should simultaneously perform channel selection and image channel removal and selectively operate according to a channel, performance decreases. Also, the manufacturing process is more complicated.

SUMMARY OF THE INVENTION

An aspect of the present invention is to provide a receiver that uses a digital channel filter instead of a PLL frequency synthesizer so as to reduce a layout area of a chip, simplify a system, and reduce the current consumption, and to a receiving method using the same.

Aspects of the present invention are not limited to those mentioned above, and other objects of the present invention will be apparent to those skilled in the art through the following description.

Exemplary embodiments of the present invention overcome the above disadvantages and other disadvantages not described above. However, the present invention is not required to overcome the disadvantages described above, and an exemplary embodiment of the present invention may not overcome any of the problems described above.

According to an exemplary embodiment of the present invention, a receiver is provided. The receiver includes a radio frequency (RF) receiving unit which receives an RF signal; a band-selecting unit which passes a frequency band of the RF signal received by the RF receiving unit; an RF amplifier which receives and amplifies the RF signal which is passed by the band-selecting unit; a local oscillation (LO) signal generator which generates an LO signal having a fixed frequency; a mixer which mixes the LO signal with the amplified RF signal to lower the frequency of the amplified RF signal, and outputs the mixed signal as an intermediate frequency (IF) signal; an IF amplifier which receives and amplifies the IF signal; an analog to digital (A/D) converter which converts the IF signal amplified by the IF amplifier into a digital signal; and a channel-selecting unit which selectively passes frequencies of the digital signal corresponding to a specific channel The receiver may further include a digital demodulator which demodulates a signal corresponding to the frequencies selectively passed by the channel selecting unit and transmits the demodulated signal to a main body.

According to another exemplary embodiment of the invention, there is provided a receiving method. The method includes passing a frequency band of a radio frequency (RF) signal received by an RF receiving unit; amplifying the passed RF signal; generating a local oscillation (LO) signal having a fixed frequency; mixing the LO signal with the amplified RF signal to lower the frequency of the amplified RF signal; outputting an intermediate frequency (IF) signal; amplifying the IF signal; converting the amplified IF signal into a digital signal; and selectively passing frequencies of the digital signal corresponding to a specific channel.

The receiving method may further include demodulating the digital signal corresponding to the frequencies selectively passed and transmitting the demodulated signal.

According to another exemplary embodiment of the present invention, there is provided a computer readable recording medium comprising a program for controlling a computer to perform the receiving method.

BRIEF DESCRIPTION OF THE DRAWINGS

The above and other aspects of the present invention will become more apparent by describing in detail certain exemplary embodiments thereof with reference to the attached drawings, in which:

FIG. 5 is a flowchart showing a receiving method according to a second exemplary embodiment of the present invention.

DESCRIPTION OF EXEMPLARY EMBODIMENTS OF THE PRESENT INVENTION

Figure 1:
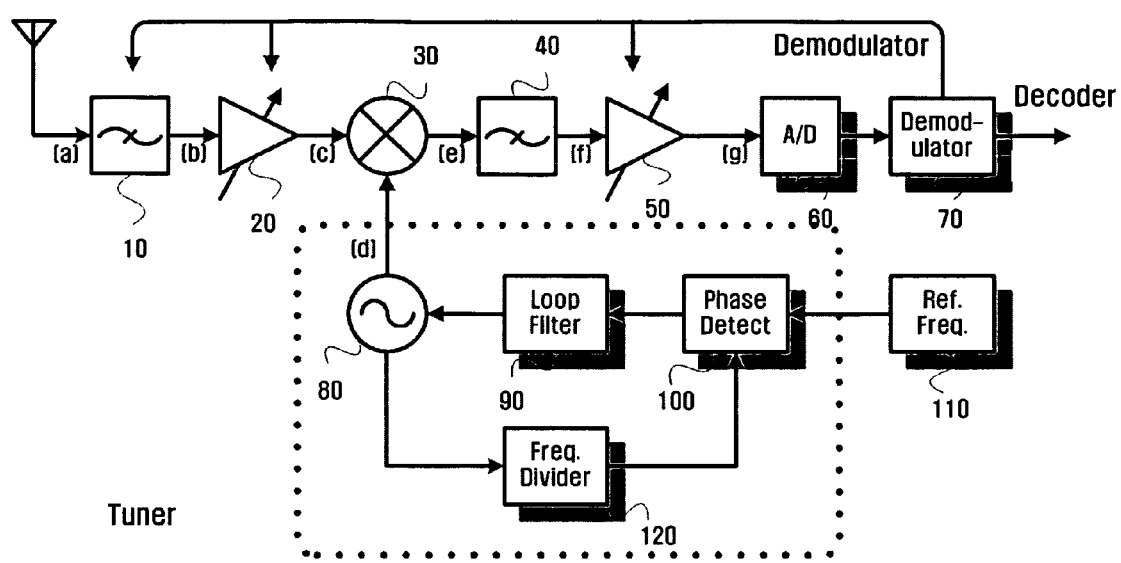
FIG. 1 is a view showing the configuration of a receiver with a PLL frequency synthesizer according to the related art.
Figure 2A:
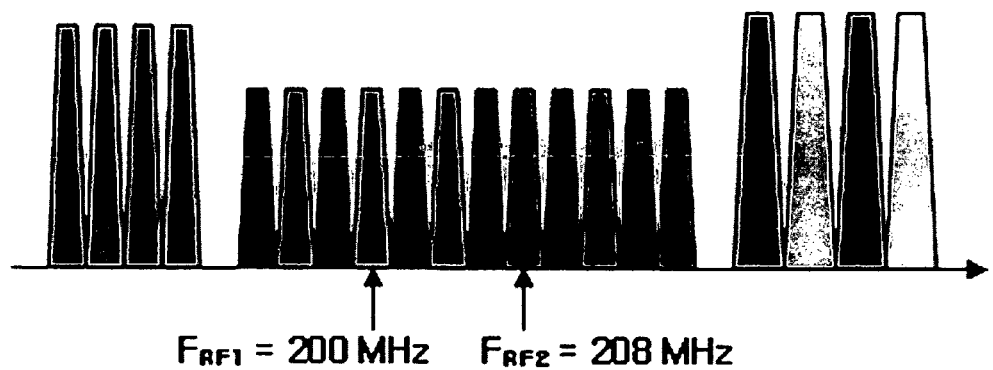
FIGS. 2A to 2G are views showing schematic spectrums of frequency signals output from individual blocks of the receiver of FIG. 1.
Figure 2B:
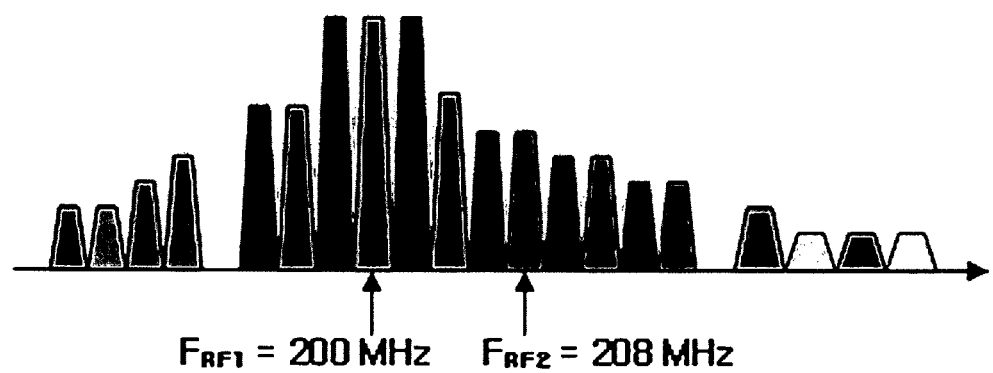
Figure 2C:
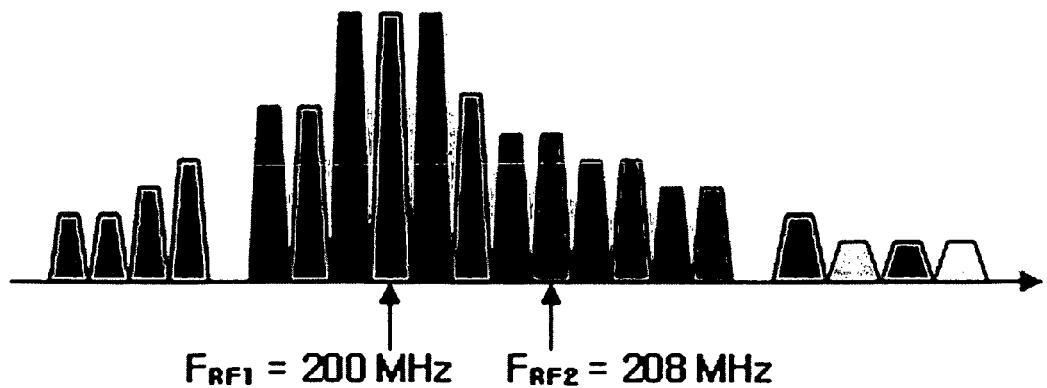
Figure 2D:
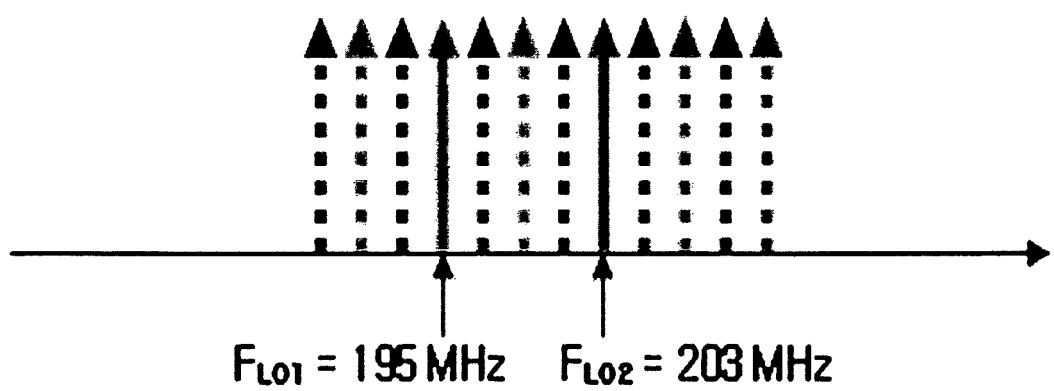
Figure 2E:
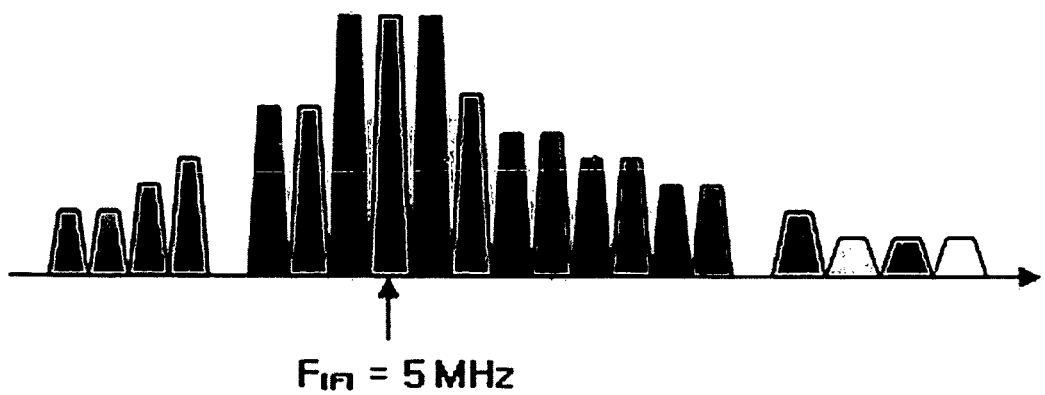
Figure 2F:
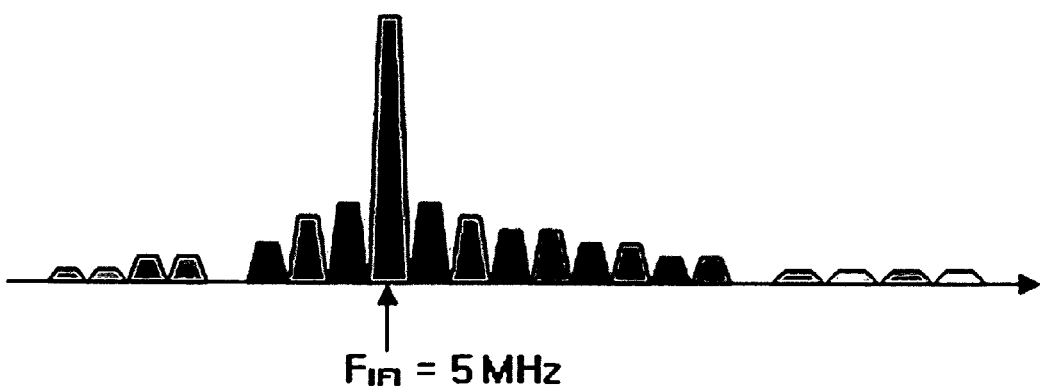
Figure 2G:
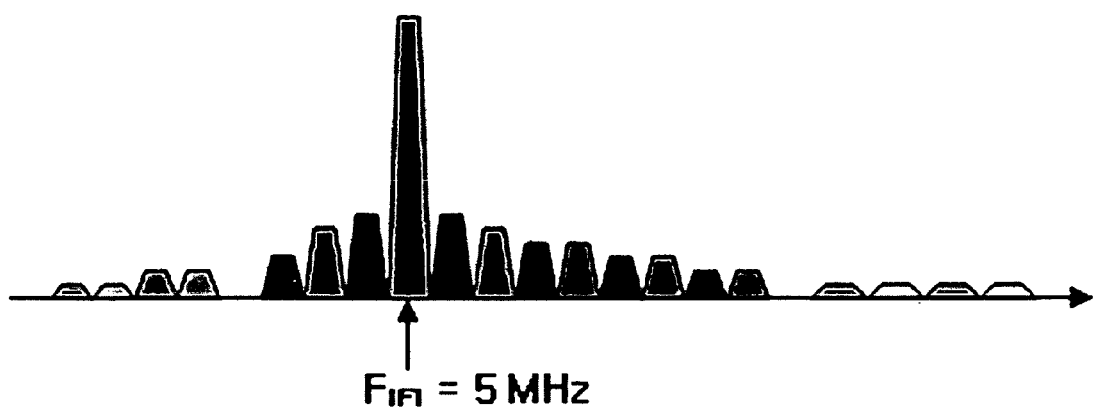

Advantages and aspects of the present invention and methods of accomplishing the same may be understood more readily by reference to the following detailed description of exemplary embodiments and the accompanying drawings. The present inventive concept may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

Exemplary embodiments of the present invention will now be described more fully with reference to the accompanying block diagrams and flows charts, in which exemplary embodiments of the invention are shown.

Figure 3:
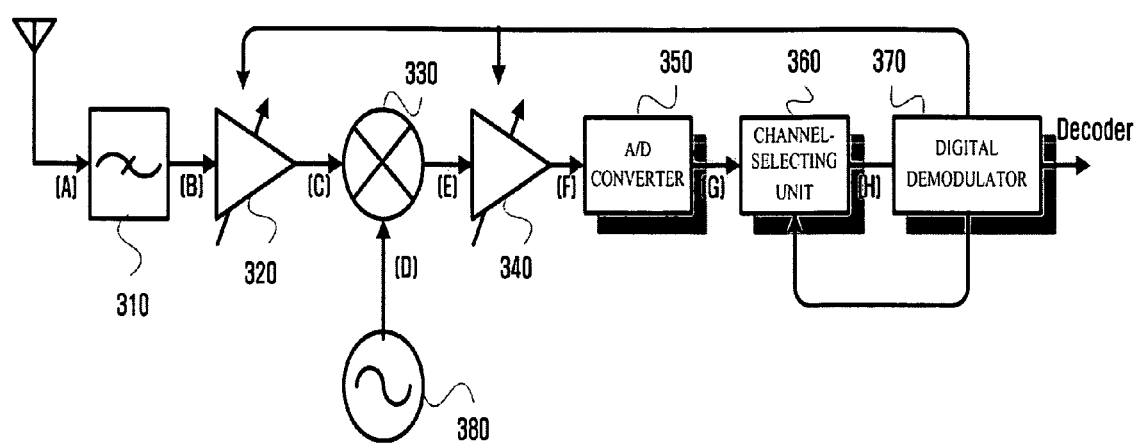
FIG. 3 is a view showing the configuration of a receiver without a PLL frequency synthesizer according to a first exemplary embodiment of the present invention.

FIG. 3 is a view showing the configuration of a receiver implemented without using a PLL frequency synthesizer according to a first exemplary embodiment of the invention. FIGS. 4A to 4H are views showing schematic spectrums of frequency signals output from individual blocks of the receiver of FIG. 3.

Referring to FIG. 3, the receiver according to the first exemplary embodiment of the invention includes a band-selecting unit 310, an RF amplifier 320, a mixer 330, an IF amplifier 340, an A/D converter 350, a channel-selecting unit 360, a digital demodulator 370, and a local oscillation (LO) signal generator 380.

Figure 4A:
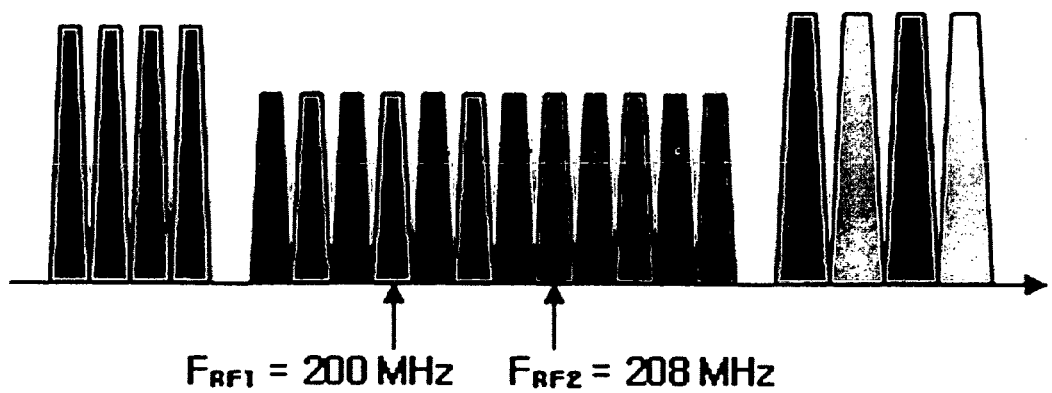
FIGS. 4A to 4H are views showing schematic spectrums of frequency signals output from individual blocks of the receiver of FIG. 3.
Figure 4B:
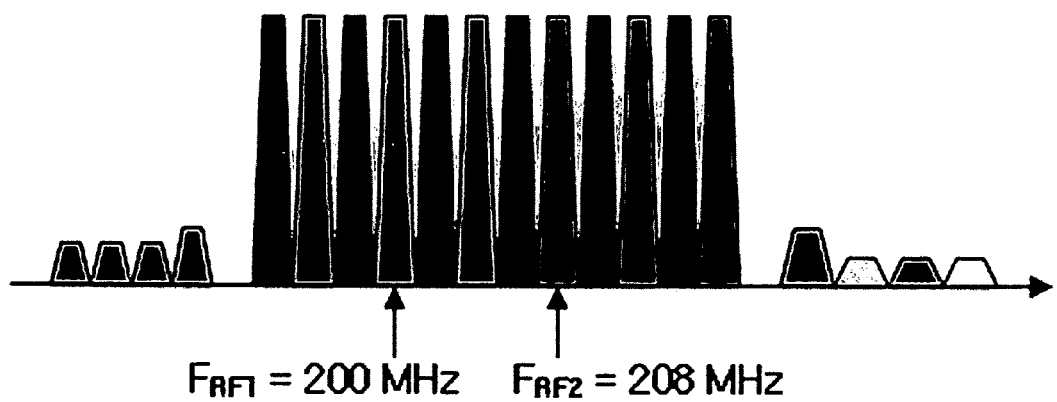
Figure 4C:
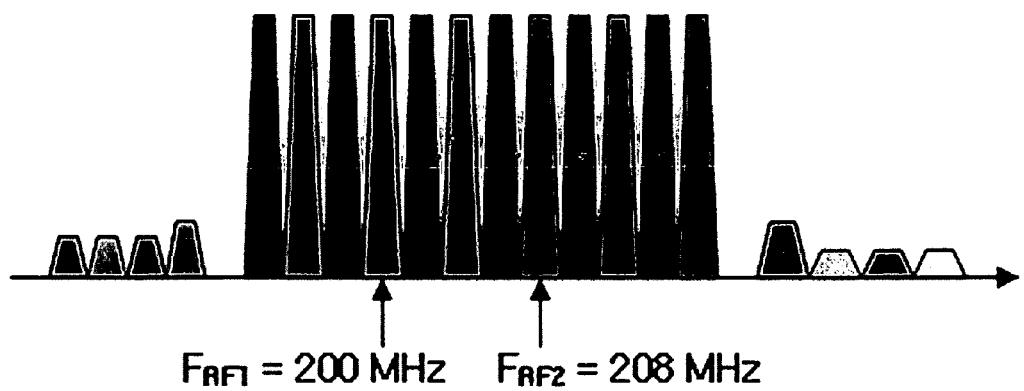
Figure 4D:
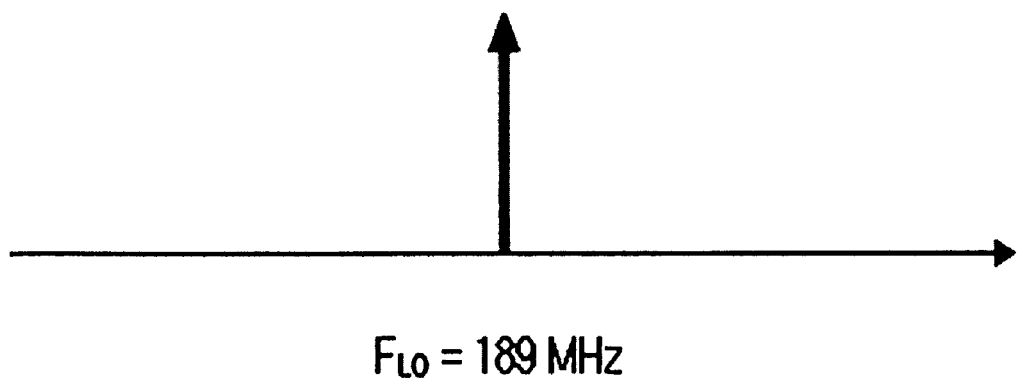

The band-selecting unit 310 functions to receive an RF signal from an RF receiving unit and pass a frequency band, which may be predetermined, of the RF signal. The frequency band denotes a frequency band assigned to a wireless communication method of a main body coupled to the receiver according to the first exemplary embodiment of the invention. For example, in a T-DMB method, the band-selecting unit 310 passes a frequency band of about 174 MHz to about 216 MHz. Referring to FIG. 4, when an input signal "A" passes through the band-selecting unit 310, a signal "B" is output. Exemplary signals at points "A" and "B" in FIG. 3 are shown in FIGS. 4A and 4B, respectively. For example, as shown in FIG. 4B, a frequency signal having center frequencies of 200 MHz and 208 MHz is output. The band-selecting unit 310, which is a kind of BPF, does not select channels, but rather selects a frequency band including all channels at once.

The RF amplifier 320 receives and amplifies the passed RF signal "B". In particular, the RF amplifier 320 receives the RF signal "B", amplifies the RF signal "B" on the basis of a control signal for demodulation from the digital demodulator 370 to obtain a certain gain, which may be predetermined, and outputs the amplified signal as a signal "C", shown in FIG. 4C.

The LO signal generator 380 generates an LO frequency signal fixed to a frequency having one amplitude. In particular, since the LO signal generator 380 does not use a PLL frequency synthesizer, it generates an LO frequency signal "D", shown in FIG. 4D, fixed to a single tone regardless of channels. For example, in FIG. 4D, the waveform of the LO frequency signal has one tone of 189 MHz.

Figure 4E:
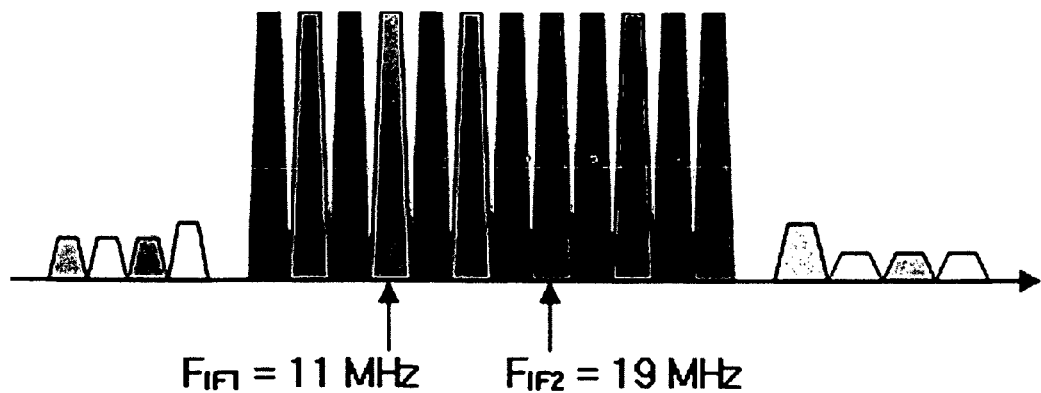
Figure 4F:
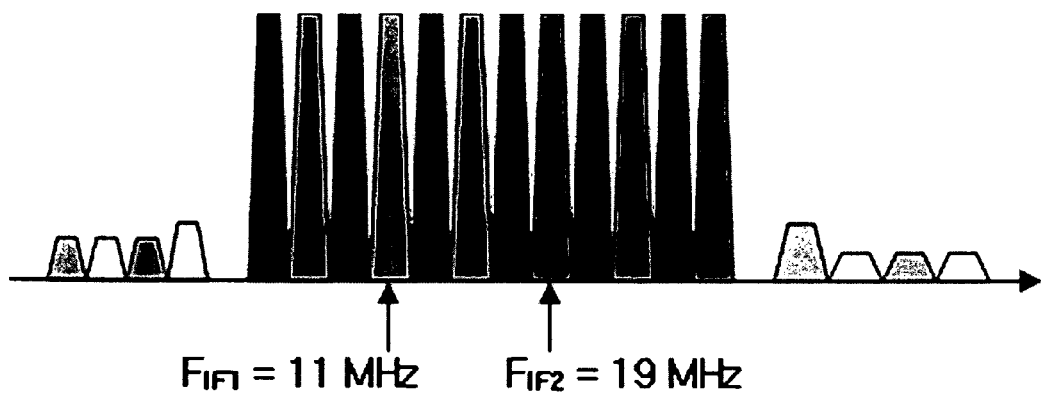

The mixer 330 mixes the RF signal "C" amplified by the RF amplifier 320 with the LO signal "D" generated by the LO signal generator 380 to lower the frequency of the RF signal, and outputs an IF signal "E", shown in FIG. 4E.

The IF amplifier 340 receives the IF signal "E" output from the mixer 330 and amplifies the signal. In particular, the IF amplifier 340 receives the IF signal "E", amplifies the IF signal "E" on the basis of a control signal for amplification from the digital demodulator 370 to obtain a certain gain, which may be predetermined, and outputs the amplified signal as a signal "F", shown in FIG. 4F. The signal "E" and the signal "F" obtained by amplifying the signal "E" have center frequencies corresponding to the differences between the signal "C" and the signal "D". For example, in FIGS. 4E and 4F, the signal "E" and the signal "F" have a center frequency of 11 MHz corresponding to the difference between 200 MHz and 189 MHz and a center frequency of 19 MHz corresponding to the difference between 208 MHz and 189 MHz.

Figure 4G:
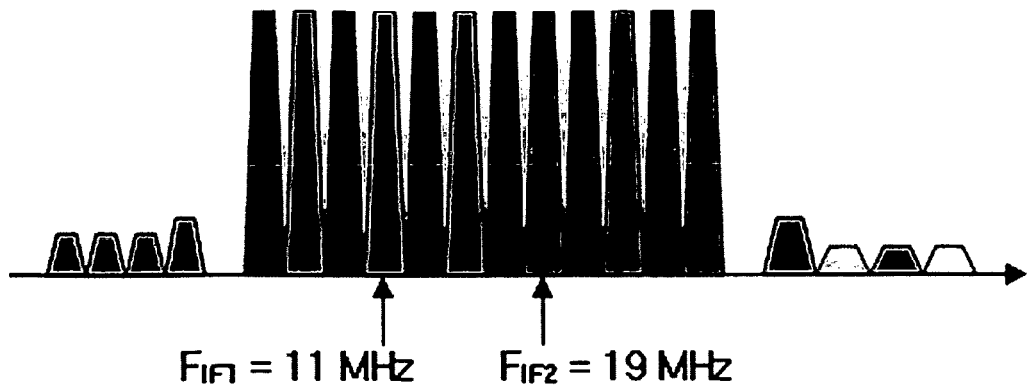

The A/D converter 350 converts the IF signal "F" amplified by the IF amplifier 340 into a digital signal "G", shown in FIG. 4G.

Figure 4H:
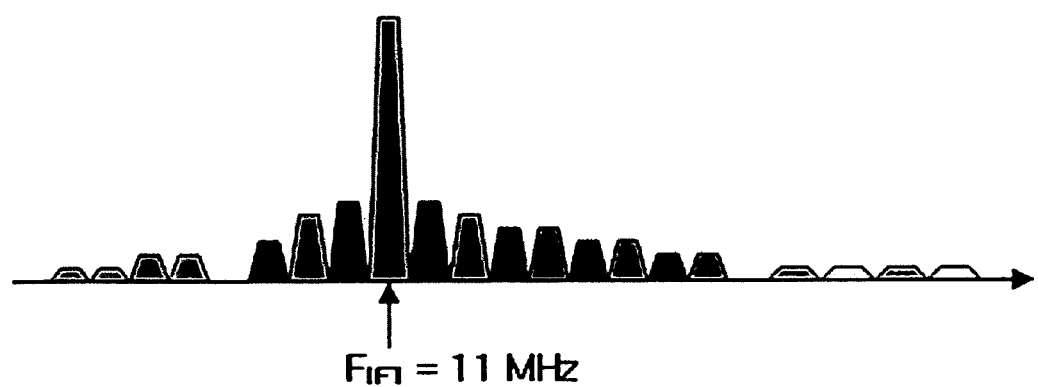

The channel-selecting unit 360 receives the converted digital signal "G", and selectively passes frequencies corresponding to a specific channel selected by a main body that is connected to the receiver and uses a certain wireless communication method. The certain wireless communication method may be predetermined. A filter used in the channel selecting unit 360 is a digital channel filter, and functions to selectively pass only a channel corresponding to a desired IF signal, and to process a digital signal. A signal "H", shown in FIG. 4H, selected by the channel-selecting unit 360 may be a signal of 11 MHz, as shown in FIG. 4H, or a signal of 19 MHz (not shown in FIG. 4H). In FIG. 4H, for convenience, only the signal of 11 MHz is selected.

The digital demodulator 370 demodulates a signal corresponding to the frequencies selectively passed by the channel selecting unit 360, and transmits the demodulated signal to the main body.

In the above description, the certain communication method can be applied to all kinds of methods using wireless communication, and is specifically effective in a digital multimedia broadcasting (DMB) communication method. The certain communication method may be predetermined.

The term "unit", that is, "module" or "table" denotes a software or a hardware component such as an field programmable gate array (FPGA) or an application specific integrated circuit (ASIC). A module has a specific function. However, a module is not limited to software or hardware. A module can be made in an addressable storage medium and can be made to reproduce at least one processor. Therefore, as an example, a module includes components such as software components, object-oriented software components, class components, and task components, processors, functions, attributes, procedures, sub-routines, segments of program code, drivers, firmware, microcode, circuits, data, databases, data structures, tables, arrays, and variables. Functions provided in the components and the modules can be combined so as to be realized by a smaller number of components and modules or can be divided so as to be realized by additional components and modules. Further, the components and the modules can be realized to reproduce at least one CPU in the device.

FIG. 5 is a flowchart showing a receiving method according to a second exemplary embodiment of the present invention. The receiving method according to the second exemplary embodiment of the invention will now be described with reference to FIG. 5.

The band-selecting unit 310 passes a frequency band of RF signals received by the RF receiving unit with the antenna (S502). The frequency band may be predetermined. The frequency band denotes a frequency band assigned to a wireless communication method that is used for the main body coupled to the receiver according to the first exemplary embodiment of the invention.

The RF amplifier 320 receives the passed RF signal and amplifies the signal (S504). The RF amplifier 320 also receives the control signal for amplification from the digital demodulator 370 and amplifies the RF signal on the basis of the control signal to obtain a certain gain, which may be predetermined.

The LO signal generator 380 generates an LO signal having one fixed frequency, and the mixer 330 mixes the generated LO signal with the amplified RF signal to lower the frequency of the signal, and outputs the IF signal (S506). The IF amplifier 340 receives and amplifies the IF signal (S508). The A/D converter 350 converts the amplified IF signal into a digital signal (S510). The IF amplifier 340 also receives the control signal for amplification from the digital demodulator 370 and amplifies the IF signal on the basis of the control signal to obtain a certain gain, which may be predetermined, similar to the RF amplifier 320.

The channel-selecting unit 360 selectively passes frequencies of the converted digital signal corresponding to a specific channel. The specific channel may be selected by the main body that is coupled to the receiver and uses a certain wireless communication method, which may be predetermined (S512).

The digital demodulator 370 demodulates a signal corresponding to the frequencies selectively passed. The digital demodulator may also transmit the demodulated signal to the main body (S514).

In the above description, the communication method can be applied to all kinds of methods using wireless communication, and is specifically effective in a digital multimedia broadcast (DMB) communication method.

It will be apparent that the scope of the receiver implemented without using a PLL frequency synthesizer according to exemplary embodiments of the present invention is extended to a computer readable recording medium having a program for allowing a computer to perform the above-mentioned method recorded thereon.

Although the present inventive concept has been described in connection with certain exemplary embodiments of the present invention, it will be apparent to those skilled in the art that various modifications and changes may be made thereto without departing from the scope and spirit of the invention. Therefore, it should be understood that the above exemplary embodiments are not limitative, but illustrative in all aspects. The scope of the present invention is defined by the appended claims rather than by the description preceding them, and therefore all changes and modifications that fall within metes and bounds of the claims, or equivalents of such metes and bounds are therefore intended to be embraced by the claims.

According to the receiver implemented without using a PLL frequency synthesizer and the receiving method using the same, since the PLL frequency synthesizer is not used, various elements constituting the PLL frequency synthesizer are not required, thereby simplifying the system and reducing the development period.

Further, the layout area of the chip can be reduced, which reduces the price of the chip, and the current consumption of the receiver can be reduced, which extends the battery lifetime.

Effects of exemplary embodiments of the present invention are not limited to the above-mentioned effects, and other effects will be apparent to those skilled in the art from the claims.

What is claimed is:

1. A receiver implemented without using a phase locked loop frequency synthesizer, the receiver comprising:
   a radio frequency (RF) receiving unit which receives an RF signal;
   a band-selecting unit which passes a frequency band of the RF signal received by the RF receiving unit;
   an RF amplifier which receives and amplifies the RF signal which is passed by the band-selecting unit;
   a local oscillation (LO) signal generator which generates an LO signal having a fixed frequency;
   a mixer which mixes the LO signal with the amplified RF signal to lower the frequency of the amplified RF signal, and outputs the mixed signal as an intermediate frequency (IF) signal;
   an IF amplifier which receives and amplifies the IF signal;
   an analog to digital (A/D) converter which converts the IF signal amplified by the IF amplifier into a digital signal;
   a channel-selecting unit which selectively passes frequencies of the digital signal corresponding to a specific channel; and
   a digital demodulator which demodulates a signal corresponding to the frequencies selectively passed by the channel-selecting unit, and outputs a control signal to control the channel-selecting unit,
   wherein the frequency band denotes a frequency band assigned to a wireless communication method of a main body coupled to the receiver.

2. The receiver of claim 1, wherein the RF receiving unit receives the RF signal transmitted by a transmitting station.

3. The receiver of claim 1, wherein the specific channel is selected by a main body that is coupled to the receiver and uses a certain wireless communication method.

4. The receiver of claim 3, wherein the frequency band is a frequency band assigned to the certain wireless communication method.

5. The receiver of claim 4, wherein the certain communication method is a digital multimedia broadcasting (DMB) method.

6. The receiver of claim 3, wherein the certain communication method is a digital multimedia broadcasting (DMB) method.

7. The receiver of claim 1, wherein the digital demodulator transmits the demodulated signal to a main body.

8. The receiver of claim 1, wherein the RF amplifier receives a control signal from the digital demodulator and amplifies the RF signal on the basis of the control signal.

9. The receiver of claim 8, wherein the RF signal is amplified based on the control signal to obtain a certain gain.

10. The receiver of claim 1, wherein the IF amplifier receives a control signal from the digital demodulator and amplifies the IF signal on the basis of the control signal.

11. The receiver of claim 10, wherein the IF signal is amplified based on the control signal to obtain a certain gain.

12. A receiving method of a receiver implemented without using a phase locked loop frequency synthesizer, the method comprising:
   passing a frequency band of a radio frequency (RF) signal received by an RF receiving unit;
   amplifying the passed RF signal;
   generating a local oscillation (LO) signal having a fixed frequency;
   mixing the LO signal with the amplified RF signal to lower the frequency of the amplified RF signal;
   outputting an intermediate frequency (IF) signal;
   amplifying the IF signal;
   converting the amplified IF signal into a digital signal;
   selectively passing frequencies of the digital signal corresponding to a specific channel;
   demodulating the digital signal corresponding to the frequencies selectively passed; and
   receiving a control signal based on the demodulation of the digital signal and selectively passing frequencies corresponding to the specific channel on the basis of the control signal
   wherein the frequency band denotes a frequency band assigned to a wireless communication method of a main body coupled to the receiver.

13. The receiving method of claim 12, wherein amplifying the passed RF signal comprises receiving the RF signal, and amplifying the IF signal comprises receiving the IF signal.

14. The receiving method of claim 12, wherein the specific channel is selected by a main body that is coupled to the receiver and that uses a certain wireless communication method.

15. The receiving method of claim 14, wherein the frequency band is a frequency band assigned to the certain wireless communication method.

16. The receiving method of claim 15, wherein the certain wireless communication method is a digital multimedia broadcasting (DMB) method.

17. The receiving method of claim 14, wherein the certain wireless communication method is a digital multimedia broadcasting (DMB) method.

18. The receiving method of claim 12, further comprising transmitting the demodulated signal to a main body.

19. The receiving method of claim 12, wherein the amplifying the passed RF signal comprises receiving a control signal and amplifying the passed RF signal on the basis of the control signal.

20. The receiving method of claim 19, wherein the passed RF signal is amplified based on the control signal to obtain a certain gain.

21. The receiving method of claim 12, wherein the amplifying of the IF signal comprises receiving a control signal and amplifying the IF signal on the basis of the control signal.

22. The receiving method of claim 21, wherein the passed RF signal is amplified based on the control signal to obtain a certain gain.

23. A computer readable recording medium encoded with a computer program for performing the receiving method of claim 12.

24. The receiving method of claim 23, wherein amplifying the passed RF signal comprises receiving the RF signal, and amplifying the IF signal comprises receiving the IF signal.

25. The receiving method of claim 23, wherein the specific channel is selected by a main body that is coupled to the receiver and that uses a certain wireless communication method.

26. The receiving method of claim 25, wherein the frequency band is a frequency band assigned to the certain wireless communication method.

27. The receiving method of claim 26, wherein the certain wireless communication method is a digital multimedia broadcasting (DMB) method.

28. The receiving method of claim 25, wherein the certain wireless communication method is a digital multimedia broadcasting (DMB) method.

29. The receiving method of claim 23, further comprising demodulating the digital signal corresponding to the frequencies selectively passed.

30. The receiving method of claim 29, further comprising transmitting the demodulated signal to a main body.

31. The receiving method of claim 23, wherein the amplifying the passed RF signal comprises receiving a control signal and amplifying the passed RF signal on the basis of the control signal.

32. The receiving method of claim 31, wherein the passed RF signal is amplified based on the control signal to obtain a certain gain.

33. The receiving method of claim 23, wherein the amplifying of the IF signal comprises receiving a control signal and amplifying the IF signal on the basis of the control signal.

34. The receiving method of claim 33, wherein the passed RF signal is amplified based on the control signal to obtain a certain gain.

\* \* \* \* \*